(12) United States Patent
Huang et al.

(10) Patent No.: US 11,841,328 B2
(45) Date of Patent: Dec. 12, 2023

(54) METHOD AND DEVICE FOR TESTING ELECTRODE SHEET

(71) Applicant: CONTEMPORARY AMPEREX TECHNOLOGY CO., LIMITED, Fujian (CN)

(72) Inventors: Guoda Huang, Fujian (CN); Weizhi Zhou, Fujian (CN); Yuanfu Chen, Fujian (CN); Qingqing Song, Fujian (CN); Kai Cui, Fujian (CN); Minjiang Xu, Fujian (CN); Yiruo Wang, Fujian (CN); Gang Lin, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/135,743

(22) Filed: Apr. 18, 2023

(65) Prior Publication Data

US 2023/0266254 A1    Aug. 24, 2023

Related U.S. Application Data

(63) Continuation of application No. PCT/CN2022/076799, filed on Feb. 18, 2022.

(51) Int. Cl.
*G01B 11/04* (2006.01)
*G01N 21/892* (2006.01)

(52) U.S. Cl.
CPC ......... *G01N 21/892* (2013.01); *G01B 11/043* (2013.01); *G01N 2201/126* (2013.01)

(58) Field of Classification Search
CPC .... G01N 21/76; G01N 21/253; G01N 21/892; G01N 27/3272; G01N 27/30;
(Continued)

(56) References Cited

U.S. PATENT DOCUMENTS

| | | | | |
|---|---|---|---|---|
| 2009/0235118 A1* | 9/2009 | Chi | ......................... | H04L 43/50 714/27 |
| 2014/0063360 A1* | 3/2014 | Kunishi | ................ | G06F 3/0443 349/12 |
| 2019/0234793 A1* | 8/2019 | Matsuura | ................. | G01N 3/08 |
| 2023/0127246 A1 | 4/2023 | Xu et al. | | |

FOREIGN PATENT DOCUMENTS

| | | | | |
|---|---|---|---|---|
| CN | 1788202 A | * | 6/2006 | ........... G01R 1/0735 |
| CN | 206832218 U | | 1/2018 | |

(Continued)

OTHER PUBLICATIONS

International Search Report and Written Opinion dated Aug. 2, 2022, received for PCT Application PCT/CN2022/076799, filed on Feb. 18, 2022, 20 pages including English Translation.

(Continued)

*Primary Examiner* — Jeffrey P Aiello
(74) *Attorney, Agent, or Firm* — XSENSUS LLP

(57) ABSTRACT

A method and a device for testing an electrode sheet, the method may comprise: acquiring M pieces of test data of a tab, wherein the tab protrudes from the end face of the electrode sheet along the first direction, the M pieces of test data are the test data of the tab at M consecutive positions along the second direction, the M pieces of test data are the test data of the height of the tab in the first direction, the second direction is perpendicular to the first direction, and M is a positive integer greater than 1; and determining whether the shape of the tab is normal based on the M pieces of test data.

30 Claims, 6 Drawing Sheets

(58) Field of Classification Search
CPC .. G01N 27/403; G01N 27/4145; G01B 11/04; Y02E 10/50; Y02E 10/76; Y02E 60/10; Y02P 70/50; H01M 50/54; H01M 50/103; H01M 50/531; H01M 50/533; H01M 50/534; H01M 50/536; H01M 50/538; H01M 10/0431; H01M 10/0413; H01M 10/0585; H01M 10/0587; H01M 4/13; H01M 4/139; H01M 4/661; G06F 3/0321
USPC ........ 29/592.1, 623.1, 825; 702/83, 82, 183, 702/58, 81
See application file for complete search history.

(56) References Cited

FOREIGN PATENT DOCUMENTS

| CN | 109580652 | A | | 4/2019 | |
| CN | 109741323 | A | | 5/2019 | |
| CN | 110132980 | A | | 8/2019 | |
| CN | 110530338 | A | | 12/2019 | |
| CN | 111193072 | A | * | 5/2020 | .......... H01M 10/058 |
| CN | 210956873 | U | * | 7/2020 | ........ H01M 10/0409 |
| CN | 210956873 | U | | 7/2020 | |
| CN | 112635848 | A | | 4/2021 | |
| CN | 212931393 | U | | 4/2021 | |
| CN | 214428674 | U | | 10/2021 | |
| CN | 113607742 | A | | 11/2021 | |
| CN | 214750875 | U | | 11/2021 | |
| CN | 215491483 | U | | 1/2022 | |
| CN | 215491483 | U | * | 1/2022 | |
| JP | 2015-170402 | A | | 9/2015 | |
| JP | 2018-092776 | A | | 6/2018 | |

OTHER PUBLICATIONS

Extended European Search Report dated Oct. 18, 2023, in correspond European Application No. 22871139.6.

* cited by examiner

METHOD AND DEVICE FOR TESTING ELECTRODE SHEET

CROSS-REFERENCE TO RELATED APPLICATION

The present application is a continuation of International Application No. PCT/CN2022/076799, filed Feb. 18, 2022, which is incorporated herein by reference in its entirety.

TECHNICAL FIELD

The present application relates to the technical field of batteries, and in particular, to a method and a device for testing electrode sheets.

BACKGROUND ART

Energy saving and emission reduction of the battery is the key to the sustainable development of automobile industry, and electric vehicles have become an important part of the sustainable development of automotive industry due to their advantages of energy saving and environmental protection. For electric vehicles, battery technology is an important factor related to their development.

Typically, a battery is composed of a plurality of battery cells, each of which comprises an electrode assembly. The electrode assembly consists of a positive electrode sheet and a negative electrode sheet, and the metal ions move between a positive electrode sheet and a negative electrode sheet to generate electricity. A tab protrudes from the end face of the electrode sheet along its width direction. The quality of the tab is related to the quality and safety of the battery, so it is necessary to test the tab.

SUMMARY OF THE DISCLOSURE

The present application provides a method and a device for testing an electrode sheet, which can effectively test tabs, and can be applied to cases where the heights of multiple tabs on the end face of the electrode sheet change consecutively, so as to test the shape of tabs with different heights.

In a first aspect, provided is a method for testing an electrode sheet, the method comprising: acquiring M pieces of test data of a tab, wherein the tab protrudes from the end face of the electrode sheet along the first direction, the M pieces of test data are the test data of the tab at M consecutive positions along the second direction, the M pieces of test data are the test data of the height of the tab in the first direction, the second direction is perpendicular to the first direction, and M is a positive integer greater than 1; and determining whether the shape of the tab is normal based on the M pieces of test data.

In this method, by testing changes in the height of the tabs at consecutive positions, abnormalities such as tab damage or tab folding can be discovered in time. Specifically, at M consecutive positions of the tab along the second direction, the height of the tab in the first direction is tested to obtain M pieces of test data corresponding to the M positions. Since the M pieces of test data are test data of the height of the tab, which can reflect changes in the profile of the tab, it can be determined whether the shape of the tab is normal according to the M pieces of test data.

In an implementation, the multiple tabs arranged along the second direction on the end face of the electrode sheet have different heights.

This method is widely applicable and can be applied to test any type of tabs. For example, it can be applied to cases where the heights of multiple tabs on the end face of the electrode sheet change consecutively, so as to test the shape of tabs with different heights.

In an implementation, the determining whether the shape of the tab is normal according to the M pieces of test data comprises: selecting N1 pieces of test data from the M pieces of test data, wherein N1 is a positive integer greater than 1, N1<M; determining whether the tab is folded according to the relationship between the N1 pieces of test data and a first threshold, wherein the first threshold is determined based on the preset height of the tab in the first direction.

The first threshold is determined based on the theoretical height of the tab in the first direction. Therefore, according to the relationship between the N1 pieces of test data selected from the M pieces of test data and the first threshold, the relationship between the actual height and the theoretical height of the tab can be determined, so as to judge whether the tab is folded. This method is simple to operate and has high accuracy, and can test tabs with gradually changed heights on the end face of the electrode sheet.

In an implementation, the determining whether the tab is folded according to the relationship between the N1 pieces of test data and the first threshold comprises: if the value of the N1 pieces of test data is smaller than the first threshold, determining that the tab is folded.

If the tab is folded, the height of the tab in the first direction will decrease and become smaller than its theoretical height. Therefore, when the value of the N1 pieces of test data is smaller than the first threshold, it can be determined that the tab is folded.

For example, the first threshold is H0−X or H0/2−X, H0 is the preset height of the tab in the first direction, and X is a preset value.

For another example, N1=(⅔)×M.

In an implementation, the determining whether the shape of the tab is normal according to the M pieces of test data comprises: selecting N2 pieces of test data and N3 pieces of test data from the M pieces of test data, respectively, wherein N2 and N3 are positive integers greater than 1, N2<M, N3<M; determining whether the tab is damaged according to the relationship between the N2 pieces of test data and a second threshold, and the relationship between the N3 pieces of test data and a third threshold, wherein the second threshold and the third threshold are determined based on the preset height of the tab in the first direction.

The second threshold and the third threshold are determined based on the theoretical height of the tab in the first direction. Therefore, according to the relationship between the N2 pieces of test data selected from the M pieces of test data and the second threshold, and the relationship between the N3 pieces of test data selected from the M pieces of test data and the third threshold, the relationship between the actual height and the theoretical height of the tab can be determined, so as to determine whether the tab is damaged. The method is simple to operate and has high accuracy, and can test tabs with gradually changing heights on the end face of the electrode sheet.

In an implementation, the determining whether the tab is damaged according to the relationship between the N2 pieces of test data and a second threshold, and the relationship between the N3 pieces of test data and a third threshold comprises: if there are more than K1 consecutive pieces of test data in the N2 pieces of test data whose value is smaller than the second threshold, and there are more than K2 pieces of test data in the N3 pieces of test data whose value is greater than the third threshold, determining that the tab is damaged, wherein K1 and K2 are preset values.

If the tab is damaged, the height of the tab in the first direction will change, and the height of the damaged position will be smaller than its theoretical height. Therefore, when there are more than K1 consecutive pieces of test data in the N2 pieces of test data whose value is smaller than the second threshold, and there are more than K2 pieces of test data in the N3 pieces of test data whose value is greater than the third threshold, it can be determined that the tab is damaged.

For example, K1=2, and/or, K2=M/2.

In an implementation, the N2 pieces of test data are N2 pieces of test data in the middle of the M pieces of test data, and the N3 pieces of test data are N3 pieces of test data at the two ends of the M pieces of test data.

The harm caused by the damage in the middle region of the tab is far greater than that caused by the damage in the edge region of the tab, so the damage in the middle region of the tab is even more intolerable. Selecting N2 pieces of test data in the middle of the M pieces of test data, and the N3 pieces of test data at the two ends, it can judge whether the tab is damaged according to the difference between the height of the middle region of the tab and the height of the two ends.

For example, N2=(1/3)×M, and N3=(2/3)×M.

For another example, the second threshold is H0/3, and/or, the third threshold is 2H0/3, wherein H0 is the preset height of the tab in the first direction.

In an implementation, the method further comprises: acquiring P pieces of test data of the non-tab region on the end face of the electrode sheet, wherein the P pieces of test data are the test data of the non-tab region at P different positions along the second direction, the P pieces of test data are the test data corresponding to the height of the non-tab region in the first direction, and P is a positive integer greater than 1; and determining whether the shape of the end face of the electrode sheet is normal according to the P pieces of test data.

Similarly, by testing changes in the height of the non-tab region on the end face of the electrode sheet at consecutive positions, this method can discover abnormalities such as electrode sheet end face damage or stockline deviation in time. Specifically, at P consecutive positions of the non-tab region along the second direction, the height of the non-tab region in the first direction is tested to obtain P pieces of test data corresponding to the P positions. The P pieces of test data are the test data corresponding to the height of the non-tab region, which can reflect changes in the profile of the non-tab region on the end face. Therefore, it can determine whether the shape and position of the end face of the electrode sheet is normal according to the P pieces of test data. This method is simple to operate and has high accuracy.

In an implementation, the determining whether the shape of the end face of the electrode sheet is normal according to the P pieces of test data comprises: if there are more than Q1 consecutive pieces of test data in the P pieces of test data whose difference with their adjacent test data is in a fourth threshold range, determining that the end face of the electrode sheet is damaged, wherein Q1 is a preset value.

For example, the fourth threshold range is between 1 mm and 3 mm.

In an implementation, the determining whether the shape of the end face of the electrode sheet is normal according to the P pieces of test data comprises: if there are Q2 pieces of test data in the P pieces of test data whose value is greater than a fifth threshold, determining that the movement direction of the electrode sheet deviates from the second direction during the test.

For example, the fifth threshold is 0.5 mm.

In an implementation, the method is performed by a device for testing an electrode sheet, the device is connected to a sensor, the sensor comprises a transmitting end and a receiving end, the transmitting end and the receiving end are arranged oppositely on the two sides of the electrode sheet, so that the electrode sheet moves between the transmitting end and the receiving end along the second direction; the transmitting end is used for emitting light, and the receiving end is used for collecting optical signals as the electrode sheet moves to multiple different positions so as to acquire the corresponding multiple pieces of test data. The acquiring the M pieces of test data of the tab comprises: acquiring the multiple pieces of test data from the sensor; and determining the M pieces of test data of the tab according to the multiple pieces of test data.

The device for testing an electrode sheet can be a subsystem independent of the main control system. The device is connected to a sensor to obtain the test data of the electrode sheet collected by the sensor. Through the cooperation between the device and the sensor, the entire electrode sheet test system has a simple structure in terms of hardware, without adding additional costs, and it is also easy to implement in terms of software. The transmitting end and the receiving end of the sensor are arranged oppositely on the two sides of the electrode sheet, and the electrode sheet moves between the transmitting end and the receiving end along the second direction. When the electrode sheet moves to multiple different positions, as the light emitted by the transmitting end is blocked by the tab to different degrees, the amount of optical signal received by the receiving end is also different. Based on this, the end face of the electrode sheet and the height of the tab protruding from the end face can be determined.

In an implementation, the height of the test region formed by the light emitted by the transmitting end in the first direction covers at least the height of the tab.

The test region formed by the light emitted by the transmitting end of the sensor on the electrode sheet should cover at least the height of the tab. In this way, when the height of the tab changes due to the folding or damage of the tab, the signal received by the receiving end will change, so that the folding or damage of the tab is detected with higher test sensitivity.

In an implementation, the sensor is used to test the tab in the process of die-cutting the electrode sheet to form the tab; or, the sensor is used to test the tab in the process of winding the electrode sheet to form the electrode assembly.

In an implementation, the determining the M pieces of test data of the tab according to the multiple pieces of test data comprises: determining test data in the multiple pieces of test data whose values change from small to large with the amount of change exceeding a sixth threshold as the initial test data in the M pieces of test data; determining M consecutive pieces of test data starting from the initial test data as the M pieces of test data of the tab.

A sudden change in the value of the test data indicates that a transition from the non-tab region to the tab or a transition from the tab to the non-tab region on the end face of the electrode sheet occurs at the test position. Therefore, when there is a piece of test data whose value changes from small to large with the amount of change exceeding the threshold among the multiple pieces of test data of multiple consecutive positions on the electrode sheet, the piece of test data is considered as the initial test data in the M pieces of test data of the tab, and the M consecutive pieces of test data starting from the initial test data is determined as the M pieces of test data of the tab, so that the test data corresponding to the tab can be accurately determined.

For example, the sixth threshold is between 3 mm and 5 mm.

In an implementation, the determining the M pieces of test data of the tab according to the multiple pieces of test data comprises: according to the preset position of the tab on the electrode sheet, determining the M pieces of test data from the multiple pieces of test data.

Since the tabs are arranged at fixed intervals on the end face of the electrode sheet, M pieces of test data corresponding to the theoretical positions of the tabs can be determined from multiple pieces of test data according to the theoretical positions of the tabs on the electrode sheet, thereby determining the M pieces of test data corresponding to the tab from the multiple pieces of test data without introducing other auxiliary calculations.

In a second aspect, provided is a method for testing an electrode sheet provided with a tab at the end face along the first direction, the method comprising: acquiring P pieces of test data of the non-tab region on the end face, wherein the P pieces of test data are the test data of the non-tab region at P different positions along the second direction, the P pieces of test data are the test data corresponding to the height of the non-tab region in the first direction, and P is a positive integer greater than 1; and determining whether the shape of the end face of the electrode sheet is normal according to the P pieces of test data.

In an implementation, the determining whether the shape of the end face of the electrode sheet is normal according to the P pieces of test data comprises: if there are more than Q1 consecutive pieces of test data in the P pieces of test data whose difference with their adjacent test data is in a fourth threshold range, determining that the end face of the electrode sheet is damaged, wherein Q1 is a preset value.

In an implementation, the fourth threshold range is between 1 mm and 3 mm.

In an implementation, the determining whether the shape of the end face of the electrode sheet is normal according to the P pieces of test data comprises: if there are Q2 pieces of test data in the P pieces of test data whose value is greater than a fifth threshold, determining that the movement direction of the electrode sheet deviates from the second direction during the test.

In an implementation, the fifth threshold is 0.5 mm.

In a third aspect, provided is a device for testing an electrode sheet, which is used to execute the method in the above-mentioned first aspect or any implementation of the first aspect, or the method in the above-mentioned second aspect or any implementation of the second aspect.

In a fourth aspect, provided is a device for testing an electrode sheet, which comprises a processor and a memory, wherein the memory is used to store a computer program, and the processor is used to call the computer program to execute the method in the above-mentioned first aspect or any implementation of the first aspect, or the method in the above-mentioned second aspect or any implementation of the second aspect.

DESCRIPTION OF DRAWINGS

In order to illustrate the technical solutions of the embodiments of the present application more clearly, the following briefly introduces the drawings required in the embodiments of the present application. Obviously, the drawings described below are only some embodiments of the present application. For those of ordinary skill in the art, other drawings can also be obtained according to the drawings without any creative effort.

Figure 1:
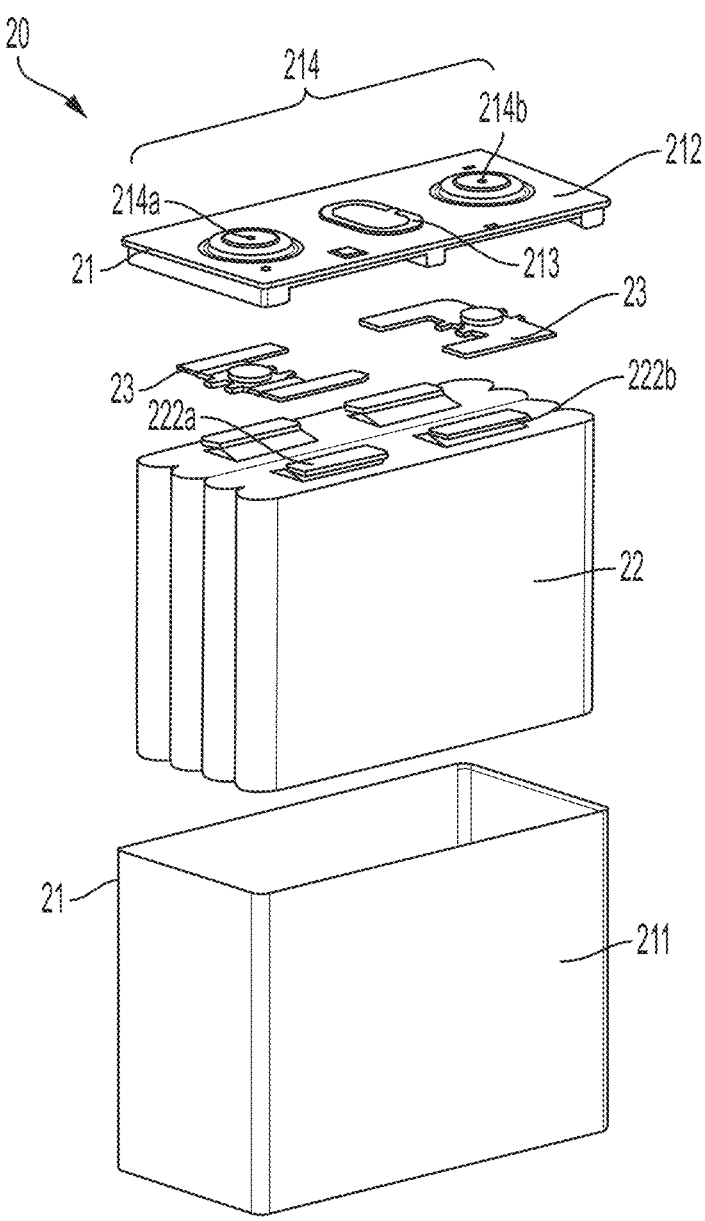
FIG. 1 is a schematic structural diagram of a battery cell.

In the drawings, the drawings are not drawn to actual scale.

DETAILED DESCRIPTION

The implementations of the present application are to be further described in detail below with reference to the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "multiple" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second", "third" and the like are used for descriptive purposes only, and cannot be construed as indicating or implying relative importance. "Vertical" is not vertical in the strict sense, but within the allowable range of error. "Parallel" is not parallel in the strict sense, but within the allowable range of error.

The orientation words appearing in the following description are the directions shown in the drawings, and do not limit the specific structure of the present application. In the description of the present application, it should also be noted that the terms "mount", "joint" and "connect" should be understood in a broad sense, unless otherwise explicitly specified or defined. For example, it may be a fixed connection, a detachable connection, or an integrated connection; and it may be a direct connection or an indirect connection through an intermediate medium. For those of ordinary skill in the art, the specific meanings of the above terms in the present application may be understood according to specific circumstances.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

Unless otherwise defined, all technical and scientific terms used in the present application have the same meaning as commonly understood by those skilled in the art to which the present application belongs. The terms used in the specification of the present application are for the purpose of describing specific embodiments only, and are not intended to limit the present application. The terms "include/comprise" and "have" and any variations thereof in the specification and claims of the present application as well as in the above description of drawings are intended to cover a non-exclusive inclusion. The terms "first", "second" and the like in the specification and claims of the present application or the above drawings are used to distinguish different objects, rather than to describe a specific sequence or primary-subordinate relationship.

Reference in the present application to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather comprises all technical solutions falling within the scope of the claims.

A battery mentioned in the present application refers to a single physical module that comprises one or more battery cells to provide higher voltage and capacity. For example, the battery mentioned in the present application may include a battery module, a battery pack, and the like. The battery generally comprises a box body for encapsulating one or more battery cells. The box body can prevent liquids or other foreign matters from affecting the charging or discharging of the battery cells.

In some embodiments, the battery cell may comprise a lithium-ion secondary battery, a lithium-ion primary battery, a lithium-sulfur battery, a sodium-lithium-ion battery, a sodium-ion battery, a magnesium-ion battery, and the like, without limitation in the embodiments of the present application. Generally, a battery cell may also be called a cell. The battery cell may be cylindrical, flat, rectangular, or in other regular or irregular shapes. The technical solutions of the embodiments of the present application can be applied to battery cells of any shape.

The battery cell comprises an electrode assembly and an electrolyte solution. The electrode assembly is composed of a positive electrode sheet, a negative electrode sheet and a separator. The battery cell works mainly relying on the movement of metal ions between the positive electrode sheet and the negative electrode sheet. The positive electrode sheet comprises a positive electrode current collector and a positive electrode active material layer. A surface of the positive electrode current collector is coated with the positive electrode active material layer. Current collectors not coated with the positive electrode active material layer protrude from the current collector coated with the positive electrode active material layer. The current collectors not coated with the positive electrode active material layer serve as positive tabs. Taking a lithium-ion battery as an example, the material of the positive electrode current collector may be aluminum, and the positive active material may be lithium cobalt oxide, lithium iron phosphate, ternary lithium, lithium manganate, and the like. The negative electrode sheet comprises a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and is used as a negative tab. The material of the negative electrode current collector may be copper, and the negative electrode active material may be carbon, silicon, and the like. In order to ensure that no fusing occurs when a large current passes, there are a plurality of positive tabs which are stacked together, and there is a plurality of negative tabs which are stacked together. The separator may be made from polypropylene (PP) or polyethylene (PE), and the like. In addition, the electrode assembly may be of a wound structure or a laminated structure, which is not limited in the embodiments of the present application.

The quality of the tabs is related to the quality and safety of the battery. Abnormalities such as tab edge damage and tab folding occur with the highest probability during the entire battery production process. Therefore, abnormalities such as tab damage and folding need to be tested to ensure the quality of the electrode assembly.

In view of this, the present application provides a technical solution, where by testing changes in the height of the tabs at consecutive positions, it is judged whether there are abnormalities such as tab damage or tab folding, so that corresponding measures can be taken to eliminate unqualified tabs when necessary, or other remedial measures are taken to improve the quality of the electrode assembly. In addition, the technical solution of the present application can also test whether the non-tab region on the end face of the electrode sheet is damaged and whether the position of the electrode sheet is shifted during the test.

As an example, as shown in FIG. 1, which is a schematic structural diagram of a possible battery cell 20 of the present application, the battery cell 20 comprises one or more electrode assemblies 22, a case 211 and an end cover 212. The case 211 and the end cover 212 form a shell or battery box 21. Both the wall of the case 211 and the end cover 212 are called the walls of the battery cell 20, wherein for the cuboid battery cell 20, the wall of the case 211 comprises a bottom wall and four side walls. The case 211 depends on the combined shape of one or more electrode assemblies 22.

For example, the case 211 can be a hollow cuboid, cube or cylinder, and one of the surfaces of the case 211 has an opening so that one or more electrode assemblies 22 may be placed inside the case 211. For example, when the case 211 is a hollow cuboid or cube, one of the planes of the case 211 is an open plane, that is, this plane does not have a wall so that the inside and outside of the case 211 communicate. When the case 211 is a hollow cylinder, the end face of the case 211 is an open plane, that is, the end face does not have a wall so that the inside and outside of the case 211 communicate. The end cover 212 covers the opening and is connected to the case 211 to form a closed cavity for accommodating the electrode assembly 22. The case 211 is filled with an electrolyte, such as an electrolyte solution.

The battery cell 20 may further comprise two electrode terminals 214, and the two electrode terminals 214 can be provided on the end cover 212. The end cover 212 is generally in the shape of a flat plate, the two electrode terminals 214 are fixed on the surface of the flat plate of the end cover 212. The two electrode terminals 214 are a positive electrode terminal 214a and a negative electrode terminal 214b, respectively. Each of the electrode terminals 214 is provided with a connection member 23, which may alternatively be referred to as a current collecting member 23 located between the end cover 212 and the electrode assembly 22 for electrically connecting the electrode assembly 22 and the electrode terminals 214.

For example, as shown in FIG. 1, each electrode assembly 22 has tabs, such as a first tab 222a and a second tab 222b. The first tab 222a and the second tab 222b are opposite in polarity. For example, when the first tab 222a is a positive tab, the second tab 222b is a negative tab. The first tabs 222a of one or more electrode assemblies 22 are connected to one electrode terminal through a connection member 23, and the second tabs 222b of one or more electrode assemblies 22 are connected to another electrode terminal through another connection member 23. For example, the positive electrode terminal 214a is connected to the positive tab through one connection member 23, and the negative electrode terminal 214b is connected to the negative tab through another connection member 23.

Figure 2:
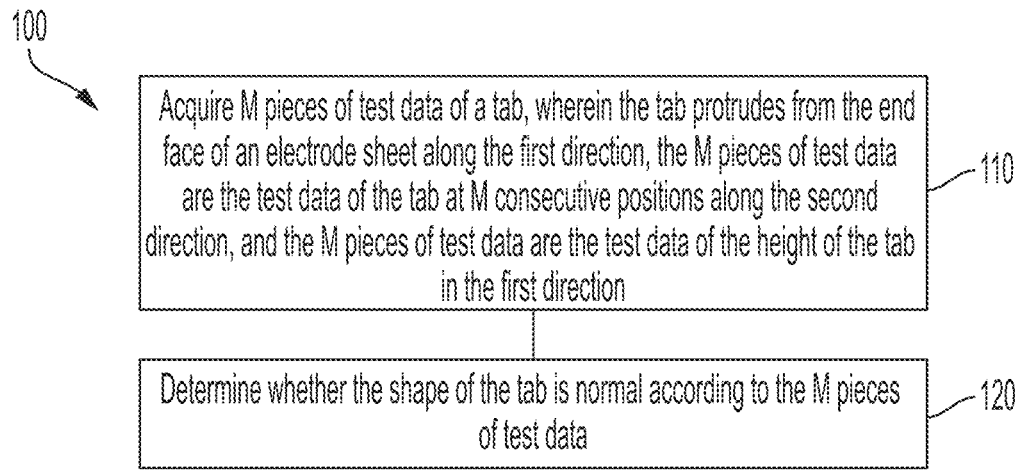
FIG. 2 is a schematic flow chart of a method for testing an electrode sheet according to an embodiment of the present application.

FIG. 2 shows a method for testing an electrode sheet according to an embodiment of the present application. As shown in FIG. 2, the method 100 for testing an electrode sheet comprises some or all of the following steps.

In step 110, M pieces of test data of the tab 222 are acquired.

Figure 3:
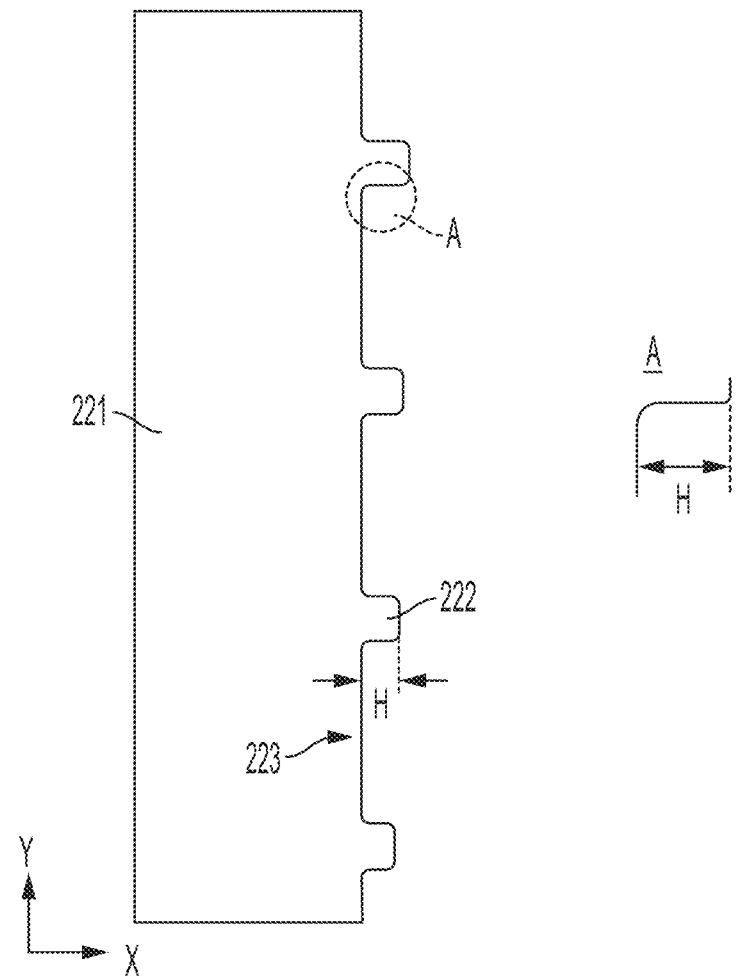
FIG. 3 is a schematic view of an electrode sheet according to an embodiment of the present application.

As shown in FIG. 3, the tab 222 protrudes from the end face 223 of the electrode sheet 221 along the first direction X, the M pieces of test data are the test data of the tab 222 at M consecutive positions along the second direction Y, and the M pieces of test data are the test data of the height H of the tab 222 in the first direction X.

The second direction Y is perpendicular to the first direction X, and M is a positive integer greater than 1.

In step 120, according to the M pieces of test data, it is determined whether the shape of the tab 222 is normal.

Here, the shape of the tab 222 being normal means that the tab 222 does not have abnormalities such as damage or folding that affect the quality of the electrode assembly 22. Therefore, step 120 may also be to determine whether the shape of the tab 222 is abnormal, including whether it is damaged or folded, according to the M pieces of test data.

The tabs 222 in the embodiment of the present application may be, for example, the first tab 222a and the second tab 222b shown in FIG. 1. For example, the first tab 222a is a positive tab and the second tab 222b is a negative tab, or the first tab 222a is a negative tab and the second tab 222b is a positive tab.

In the embodiment, by testing changes in the height H of the tabs 222 at consecutive positions, abnormalities such as tab damage or tab folding can be found in time. Specifically, at M consecutive positions of the tabs 222 along the second direction Y, the height H of the tabs 222 in the first direction X is tested to obtain M pieces of test data corresponding to the M positions. Since the test data are test data of the height H of the tab 222, which can reflect changes in the profile of the tab 222, it can be determined whether the shape of the tab 222 is normal according to the M pieces of test data.

As shown in FIG. 3, the first direction X is the width direction of the electrode sheet, that is, the breadth direction of the electrode sheet, and the height H of the tab 222 is the size of the tab in the first direction X. The height H of the tab 222 at M consecutive positions along the second direction Y may reflect changes in the profile of the tab 222. There are multiple tabs 222 protruding from the end face 223 of the electrode sheet 221 along the first direction X, and the heights of the multiple tabs 222 may be the same or different. For example, as shown in FIG. 3, the heights H of the multiple tabs 222 arranged on the end face 223 of the electrode sheet 221 along the second direction Y are different. FIG. 3 shows 4 tabs 222 as an example, and the heights H of the 4 tabs 222 increase gradually along the second direction Y from bottom to top. For the tabs 222 with different heights H, when the electrode sheet 221 is wound up to form the electrode assembly 22, the tabs 222 with a larger height H can be located on the outer ring, while the tabs 222 with a smaller height H can be located on the inner ring, which is beneficial to improve the structural reliability of the tabs 222.

The method 100 for testing an electrode sheet of the embodiment of the present application can test whether the shape of multiple electrode sheets 222 with the same height is normal. Especially, the method 100 can also be applied to cases where the heights H of multiple electrode sheets 222 on the end face 223 of the electrode sheet 221 change consecutively, so as to test whether the shapes of multiple tabs 222 with different heights H are normal.

The method 100 may be executed by a device 200 for testing an electrode sheet, and the device 200 may be, for example, a programmable logic controller (PLC). Optionally, the device 200 may be a subsystem relatively independent from the main control system, that is, the main program PLC, and signals can be transmitted between the subsystem and the main control system.

For example, the device 200 comprises a data acquisition unit 210 and a data processing unit 220. The data acquisition unit 210 is connected to a sensor 300, the sensor 300 is used to collect the test data of the height at different positions of the electrode sheet 221, and the data acquisition unit 210 is used to obtain M pieces of test data of the tab 222 from the sensor 300. The data processing unit 220 is used to determine whether the shape of the tab 222 is normal according to the M pieces of test data.

After the device 200 determines whether the shape of the tab 222 is normal, it can feed back an indication signal indicating whether the shape of the tab 222 is normal to the main control system, so as to take corresponding measures.

Figure 4:
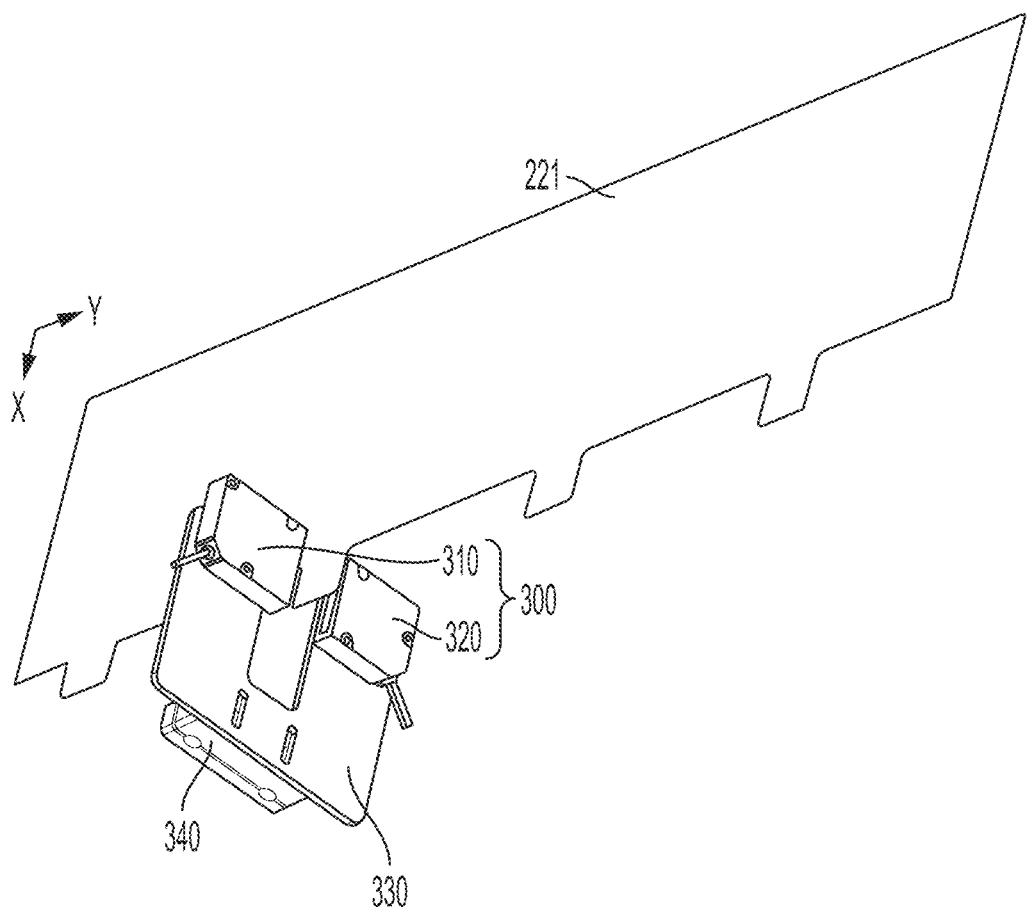
FIG. 4 is a schematic view of collection of tab data by a sensor according to an embodiment of the present application.

FIG. 4 shows a schematic diagram of the sensor 300 collecting tab data. As shown in FIG. 4, the sensor 300 comprises a transmitting end 310 and a receiving end 320, and the transmitting end 310 and the receiving end 320 are arranged oppositely on the two sides of the electrode sheet 221, so that the electrode sheet 221 moves between the transmitting end 310 and the receiving end 320 along the second direction Y. The transmitting end 310 is used to emit light, and the receiving end 320 is used to collect light signals as the electrode sheet 221 moves to multiple different positions to obtain the corresponding multiple pieces of test data.

The transmitting end 310 and the receiving end 320 are mounted and fixed through a mounting plate 330 and a mounting block 340. The transmitting end 310 and the receiving end 320 of the sensor 300 are arranged oppositely on the two sides of the electrode sheet 221, and the electrode sheet 221 moves between the transmitting end 310 and the receiving end 320 along the second direction Y. When the electrode sheet 221 moves to multiple different positions, as the light emitted by the transmitting end 310 is blocked by the tab 222 to different degrees, the amount of optical signals received by the receiving end 320 is also different. Based on this, the height H of the tab 222 protruding from the end face 223 of the electrode sheet 221 and the height of the non-tab region on the end face 223 can be determined. When the electrode sheet 221 is stationary, the amount of signals collected by the receiving end 320 as the transmitting end 310 irradiates the end face 223 can be used as the zero point of the test data. Since there is no blocking by the tab 222 at this point, the amount of signals collected by the receiving end 320 is the biggest.

At this point, in step 210, M pieces of test data of the tab 222 are obtained, which comprises: obtaining multiple pieces of test data from the sensor 300; and determining the M pieces of test data of the tab 222 according to the multiple pieces of test data.

For example, the sensor 300 collects original data of heights at different positions of the electrode sheet 221, and the data acquisition unit 210 can obtain the original data from the sensor 300. The original data can be an electrical signal output by the receiving end 320 when light irradiates the receiving end 320. The data acquisition unit 310 converts the multiple pieces of original data collected by the sensor into multiple pieces of test data, that is, multiple pieces of height data, and determines the height data corresponding to the tab 222 among the multiple pieces of height data, that is, the M pieces of test data of the tab 222.

It can be seen that the device 200 for testing electrode sheets is connected to the sensor 300 to obtain the test data of the electrode sheet 221 collected by the sensor 300. Through the cooperation between the device 200 and the sensor 300, the entire electrode sheet test system has a simple structure in terms of hardware, without adding additional costs, and it is also easy to implement in terms of software.

In the embodiment of the present application, two trigger modes, i.e., a first trigger mode and a second trigger mode, can be used to determine the M pieces of test data of the tab 222 from multiple pieces of test data.

In the first trigger mode, the determining the M pieces of test data of the tab 222 according to the multiple pieces of test data comprises: determining test data in the multiple pieces of test data whose value changes from small to large with the amount of change exceeding a sixth threshold as the initial test data in the M pieces of test data.

The sixth threshold is a preset value, for example, the sixth threshold may be between 3 mm and 5 mm.

Further, optionally, the M consecutive pieces of test data starting from the initial test data may be determined as the M pieces of test data of the tab 222.

For the region A as shown in FIG. 3, a sudden change in the value of the test data indicates that a transition from the non-tab region to the tab 222 or a transition from the tab 222 to the non-tab region on the end face 223 of the electrode sheet 221 occurs at the test position of the sensor 300. Therefore, when there is a piece of test data whose value changes from small to large with the amount of change exceeding the sixth threshold among the multiple pieces of test data at multiple consecutive positions on the electrode sheet 221, this pieces of test data is considered as the initial test data in the M pieces of test data of the tab 222, and the M consecutive pieces of test data starting from the initial test data is determined as the M pieces of test data of the tab 222, so that the test data corresponding to the tab 222 can be accurately determined.

Similarly, when there is a piece of test data whose value changes from large to small with the amount of change exceeding the sixth threshold, the test data is considered as the initial test data among the multiple pieces of test data of the non-tab region, so that multiple pieces of test data of the non-tab region can also be obtained.

Of course, when determining the test data of the tab 222 based on the first trigger mode, it is also possible to first search for the initial test data of the tab 222, then search for the initial test data of the non-tab region, and take the multiple pieces of test data between the initial test data of the tab 222 and the initial test data of the non-tab region as the multiple pieces of test data of the tab 222; the number of the multiple pieces of test data is assumed to be M.

In the second trigger mode, the determining M pieces of test data of the tab 222 according to multiple pieces of test data comprises: determining M pieces of test data from the multiple pieces of test data according to the preset position of the tab 222 on the electrode sheet 221.

The preset position of the tab 222 on the electrode sheet 221 refers to a theoretical or ideal position of the tab 222 on the electrode sheet 221. Since the tabs 222 are arranged at fixed intervals on the end face 223 of the electrode sheet 221, M pieces of test data corresponding to the theoretical position of the tab 222 can be determined from multiple pieces of test data according to the theoretical position of the tab 222 on the electrode sheet 221, thereby determining the M pieces of test data corresponding to the tab 222 from the multiple pieces of test data without introducing other auxiliary calculations. For example, for an electrode sheet 221 that can form an ideal electrode assembly 22, the position of each tab 222 on its end face 223 can be stored in advance, and the theoretical position of the tab 222 in the process of winding the electrode sheet 221 to form the electrode assembly 22 can also be stored in advance. By recording the running length of the electrode sheet 221 with an encoder, the start position and end position of the test data of the tab 222 can be found, thereby obtaining the M pieces of test data of the tab 222.

In an implementation, the height of the test region formed by the light emitted by the transmitting end 310 of the sensor 300 in the first direction X covers at least the height H of the tab 222.

The test region formed by the light emitted by the transmitting end 310 of the sensor 300 on the electrode sheet 221, that is, the light irradiation region, should at least cover the height H of the tab 222. For example, the test region exceeds the theoretical height H0 of the tab 222 in the first direction X, and exceeds the end face by 1 mm-3 mm in the direction away from the tab 222 in the first direction X. In this way, when the height H of the tab 222 changes due to abnormalities such as folding or damage of the tab, the signal received by the receiving end 320 will change significantly, so that abnormalities such as folding or damage of the tab 222 can be tested in time, resulting in higher test sensitivity.

The sensor 300 collects M pieces of test data at M consecutive positions of the tab 222 at a certain response speed. When the electrode sheet 221 moves along the second direction Y at a certain speed v, the sensor 300 collects data at regular intervals. For example, it is assumed that the response speed of the sensor 300 is 1 ms, the width of the tab 222 along the first direction X is m, and the moving speed v of the electrode sheet 221 is N mm/s. Therefore, for the test interval of the sensor 300 in the second direction Y, that is, the distance between adjacent test positions n=(N/1000), the number of test data corresponding to each tab 222 is M=m/n. The width m of the tab 222 may be in the range of 20 mm-60 mm, for example. Hereinafter, this test interval n is also referred to as data acquisition interval n.

For example, when the electrode sheet 221 moves along the second direction Y at a speed of v=1500 mm/s-2000 mm/s, the corresponding data collection interval is 1.5 mm-2 mm; when the electrode sheet 221 moves at a speed of v=2000 mm/s-4000 mm/s along the second direction Y, the corresponding data collection interval is 2 mm-4 mm.

The position of the sensor 300 is relatively flexible. In an implementation, the sensor 300 is used to test the tab 222 during die-cutting the electrode sheet to form the tab; or, in another implementation, the sensor 300 is used to test the tab 222 in the process of winding the electrode sheet 221 to form the electrode assembly.

Figure 5:
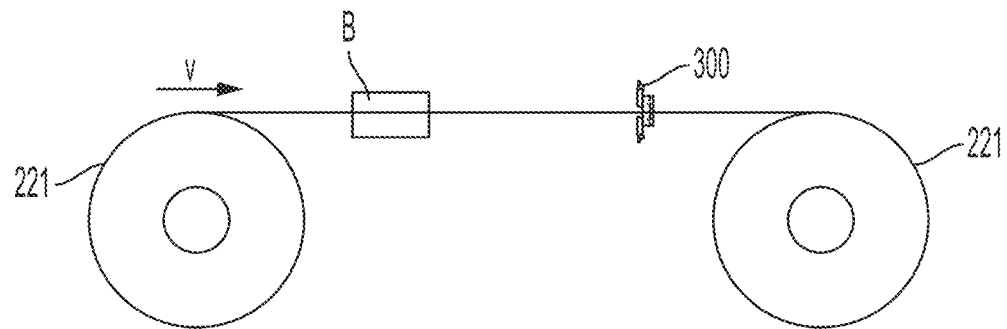
FIG. 5 is a schematic view of the mounting position of a sensor according to an embodiment of the present application.

For example, as shown in FIG. 5, the sensor 300 is used to test the tab 222 in the process of molding the tab. The tab 222 can be molded, for example, by laser die-cutting or mechanical die-cutting. The die-cutting position is, for example, position B shown in FIG. 5. After forming the tab 222 by die-cutting on the end face 223 of the electrode sheet 221, the electrode sheet 221 is wound up to form the electrode sheet reel required in the subsequent winding process. The sensor 300 can be arranged in the region of the electrode sheet 221 before it is rolled up to test whether the shape of the tab 222 is normal, so that defective tabs 222 can be found earlier in the process. When a tab 222 with abnormal shape is detected, it can be marked, so that the tab 222 with abnormal shape can be specially treated in the subsequent process.

Figure 6:
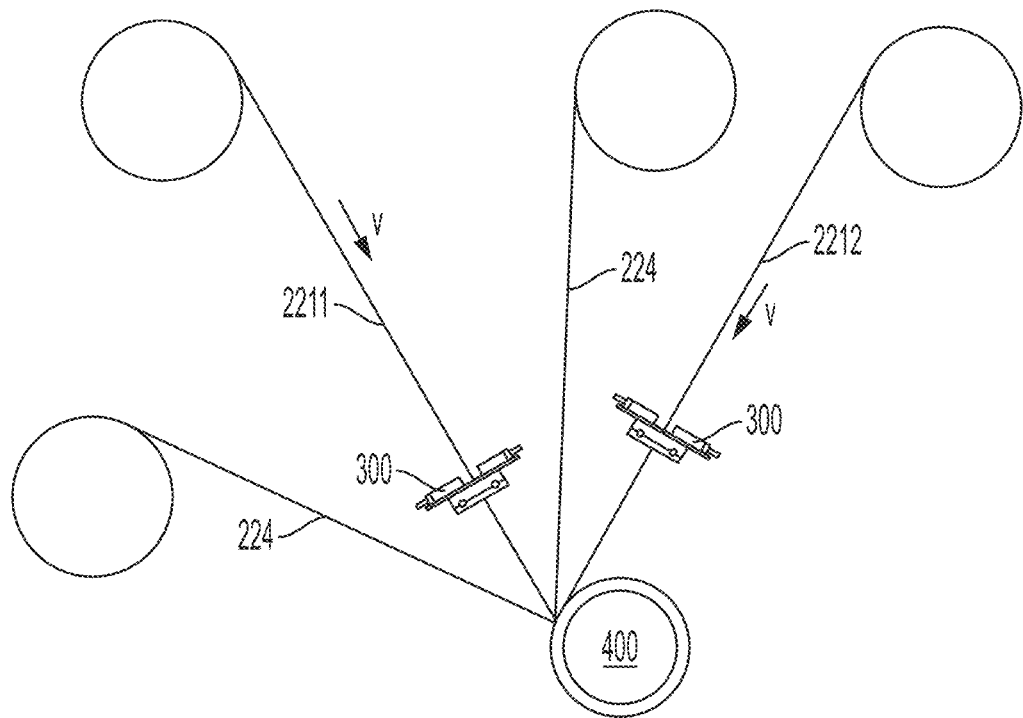
FIG. 6 is a schematic view of the mounting position of a sensor according to an embodiment of the present application.

For another example, as shown in FIG. 6, the electrode assembly 22 is composed of two types of electrode sheets 221 and two layers of separators 224. The sensor 300 is set in the process of winding the electrode sheet 221 to form the electrode assembly 22. The two types of electrode sheets 221 are a cathode electrode sheet 2211 or an anode electrode sheet 2212, respectively. The cathode electrode sheet 2211, the anode electrode sheet 2212 and the separator 224 are co-wound together in the positions shown in FIG. 6 to form the electrode assembly 22. Through the unwinding and feeding of the electrode sheet 221 and the separator 224, a winding needle 400 drives the movement of the cathode electrode sheet 2211, the anode electrode sheet 2212, and the separator 224, so that they are wound together with the winding needle 400. The sensor 300 may be disposed at the part of the cathode electrode sheet 2211 and the anode electrode sheet 2212 before they are wound up to form the electrode assembly 22, so as to find tabs 222 with abnormal shape before forming the electrode assembly 22.

Hereinafter, how to determine whether the shape of the tab 222 is normal according to the M pieces of test data of the tab 222 is described in detail.

In an implementation, in step 120, according to the M pieces of test data, the determining whether the shape of the tab 222 is normal comprises: selecting N1 pieces of test data from the M pieces of test data; and determining whether the tab 222 is folded according to the relationship between the N1 pieces of test data and a first threshold.

N1 is a positive integer greater than 1, and N1<M.

The first threshold is determined based on a preset height H0 of the tab 222 in the first direction X, that is, the theoretical height H0 of the tab 222.

Therefore, according to the relationship between the N1 pieces of test data selected from the M pieces of test data and the first threshold, the relationship between the actual height H and the theoretical height H0 of the tab 222 can be determined, so as to judge whether the tab is folded. This method is simple to operate and has high accuracy, and can test tabs with gradually changed heights on the end face of the electrode sheet.

If the tab 222 is folded, the height H of the tab 222 in the first direction X will decrease and become smaller than its theoretical height H0. Therefore, in an implementation, the determining whether the tab 222 is folded according to the relationship between the N1 pieces of test data and the first threshold comprises: if the value of the N1 pieces of test data is smaller than the first threshold, determining that the tab 222 is folded.

The first threshold may be, for example, H0−X or H0/2−X, wherein H0 is the preset height of the tab 222 in the first direction X, that is, the theoretical height of the tab 222.

X is a preset value, for example, X is 2 mm-3 mm.

N1 is a preset value, for example N1=b×M, wherein b is a preset coefficient, 0<b<1, for example b=$\frac{2}{3}$, then N1=($\frac{2}{3}$)×M.

In an implementation, in step 120, the determining whether the shape of the tab 222 is normal according to the M pieces of test data comprises: selecting N2 pieces of test data and N3 pieces of test data respectively from the M pieces of test data; and determining whether the tab 222 is damaged according to the relationship between the N2 pieces of test data and a second threshold, and the relationship between the N3 pieces of test data and a third threshold.

N2 and N3 are positive integers greater than 1, N2<M, and N3<M.

The second threshold and the third threshold are determined based on the preset height H0 of the tab 222 in the first direction X, that is, the theoretical height H0 of the tab 222.

Therefore, according to the relationship between the N2 pieces of test data selected from the M pieces of test data and the second threshold, and the relationship between the N3 pieces of test data selected from the M pieces of test data and the third threshold, the relationship between the actual height H and the theoretical height H0 of the tab 222 can be determined, so as to determine whether the tab 222 is damaged. The method is simple to operate and has high accuracy, and can test tabs with gradually changing heights on the end face of the electrode sheet.

In an implementation, the determining whether the tab 222 is damaged according to the relationship between the N2 pieces of test data and the second threshold, and the relationship between the N3 pieces of test data and the third threshold comprises: if there are more than K1 consecutive pieces of test data in the N2 pieces of test data whose value is smaller than the second threshold, and there are more than K2 pieces of test data in the N3 pieces of test data whose value is greater than the third threshold, determining that the tab 222 is damaged.

If the tab 222 is damaged, the height H of the tab 222 in the first direction X will change, and the height of the damaged position will be smaller than the theoretical height H0 of the tab 222. Therefore, when there are more than K1 consecutive pieces of test data in the N2 pieces of test data whose value is smaller than the second threshold, and there are more than K2 pieces of test data in the N3 pieces of test data whose value is greater than the third threshold, it can be determined that the tab 222 is damaged.

The second threshold may be H0/3, for example. The third threshold may be 2H0/3, for example. H0 is the preset height of the tab 222 in the first direction X, that is, the theoretical height of the tab 222.

K1 and K2 are preset values, for example, K1=2, and/or, K2=M/2.

In an implementation, the N2 pieces of test data are N2 pieces of test data in the middle of the M pieces of test data, and the N3 pieces of test data are N3 pieces of test data at the two ends of the M pieces of test data.

The harm caused by the damage in the middle region of the tab 222 is far greater than that caused by the damage in the edge region of the tab 222, so the damage in the middle region of the tab 222 is even more intolerable. Selecting N2 pieces of test data in the middle of the M pieces of test data, and N3 pieces of test data at the two ends, it can judge whether the tab 222 is damaged according to the difference between the height H of the middle region and the height H of the two ends of the tab 222.

N1 and N2 are preset values, for example, N2=(⅓)×M, and/or, N3=(⅔)×M. That is to say, the N2 pieces of test data are (⅓)×M pieces of test data in the middle of the M pieces of test data, and the N3 pieces of test data are (⅔)×M pieces of test data at the two ends of the M pieces of test data.

Figure 7:
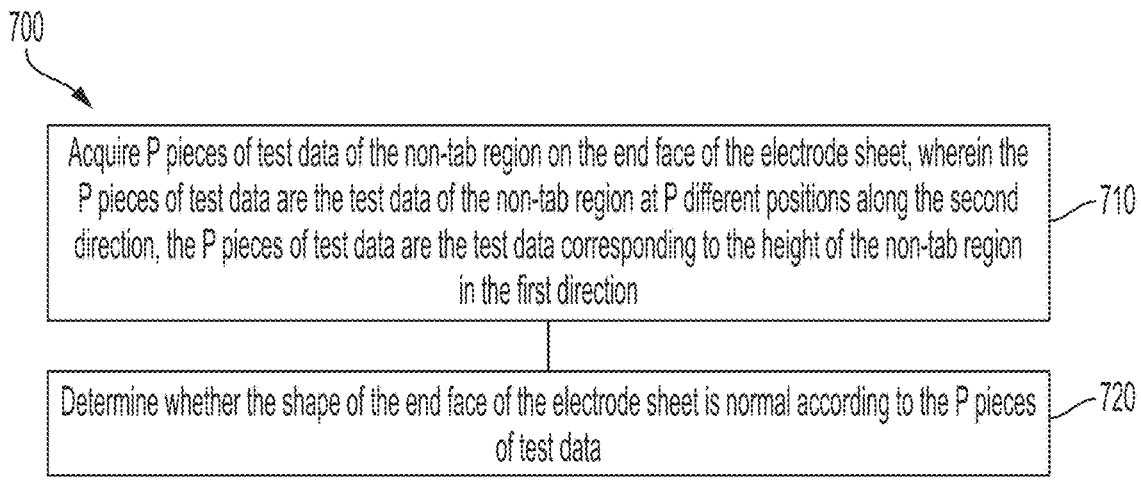
FIG. 7 is a schematic flow chart of a method for testing the end face of an electrode sheet according to an embodiment of the present application.

The test of the tab 222 has been described above, and a similar method can also be used to detect whether the shape of the end face 223 of the electrode sheet 221 is normal. FIG. 7 is a schematic flow chart of a method for testing an electrode sheet according to another embodiment of the present application. As shown in FIG. 7, the method 700 further comprises step 710 and step 720.

In step 710, P pieces of test data of the non-tab region on the end face 223 of the electrode sheet 221 are acquired.

The P pieces of test data are the test data of the non-tab region at P different positions along the second direction Y, the P pieces of test data are the test data corresponding to the height H of the non-tab region in the first direction X, and P is a positive integer greater than 1.

In step 720, it is determined whether the shape of the end face 223 of the electrode sheet 221 is normal according to the P pieces of test data.

Here, the shape of the end face 223 being normal means that the end face 223 does not have abnormalities such as damage or stockline deviation that affect the quality of the electrode assembly 22. Therefore, step 140 may also be to determine whether the shape of the end face 223 is abnormal according to the M pieces of test data, including whether there is damage and stockline deviation.

Similarly, in the embodiment, by testing changes in the height of the non-tab region of the end face 223 of the electrode sheet 221 at consecutive positions, abnormalities such as damage or stockline deviation on the end face 223 of the electrode sheet 221 can be discovered in time. Specifically, at P consecutive positions of the non-tab region along the second direction Y, the height of the non-tab region in the first direction X is tested to obtain P pieces of test data corresponding to the P positions. The P pieces of test data are the test data corresponding to the height of the non-tab region, which can reflect changes in the profile of the non-tab region on the end face 223. Therefore, it can determine whether the shape and position of the end face 223 of the electrode sheet 221 is normal according to the P pieces of test data. This method is simple to operate and has high accuracy.

In an implementation, in step 140, the determining whether the shape of the end face 223 of the electrode sheet 221 is normal according to the P pieces of test data comprises: if there are more than Q1 consecutive pieces of test data among the P pieces of test data whose difference with their adjacent test data is in a fourth threshold range, determining that the end face 223 of the electrode sheet 221 is damaged.

When the difference between the test data corresponding to consecutive pairs of adjacent positions among the P pieces of test data is within a fourth threshold range, it can be considered that the end face 223 of the electrode sheet 221 is damaged.

Q1 is a preset value, for example, Q1=4.

The fourth threshold range may be a preset numerical range, for example, the fourth threshold range is 1 mm to 3 mm.

In an implementation, in step 140, the determining whether the shape of the end face 223 of the electrode sheet 221 is normal according to the P pieces of test data comprises: if there are Q2 pieces of test data in the P pieces of test data whose value is greater than a fifth threshold, it is determined that the movement direction of the electrode sheet 221 deviates from the second direction Y during the test.

The height corresponding to the non-tab region on the end face 223 is ideally 0, and when there is a certain number of test data in the P pieces of test data that are greater than the preset fifth threshold, it means that the height of the non-tab region becomes larger. At this point, it can be considered that the movement direction of the electrode sheet 221 deviates from the second direction Y during the test, that is, stockline deviation occurs. Stockline deviation will make the electrode assembly 22 formed by winding the electrode sheet 221 unqualified.

Q2 is a preset value, for example, Q2=(⅔)×P.

The fifth threshold is a preset value, for example, the fifth threshold is 0.5 mm.

It should be understood that, for details of the test process of the non-tab region on the end face 223 of the electrode sheet 221, reference may be made to the foregoing description of the test process of the tab 222, and for the sake of brevity, details are not repeated here. The original data of the height of the non-tab region at different positions can also be collected by the sensor 300 in a similar manner. For example, as shown in FIG. 3, the sensor 300 can collect light signals as the electrode sheet 221 moves to multiple different positions to obtain the corresponding multiple pieces of test data, and obtain M pieces of test data of the tab 222 and P pieces of test data of the end face 223 respectively from the multiple pieces of test data.

Figure 8:
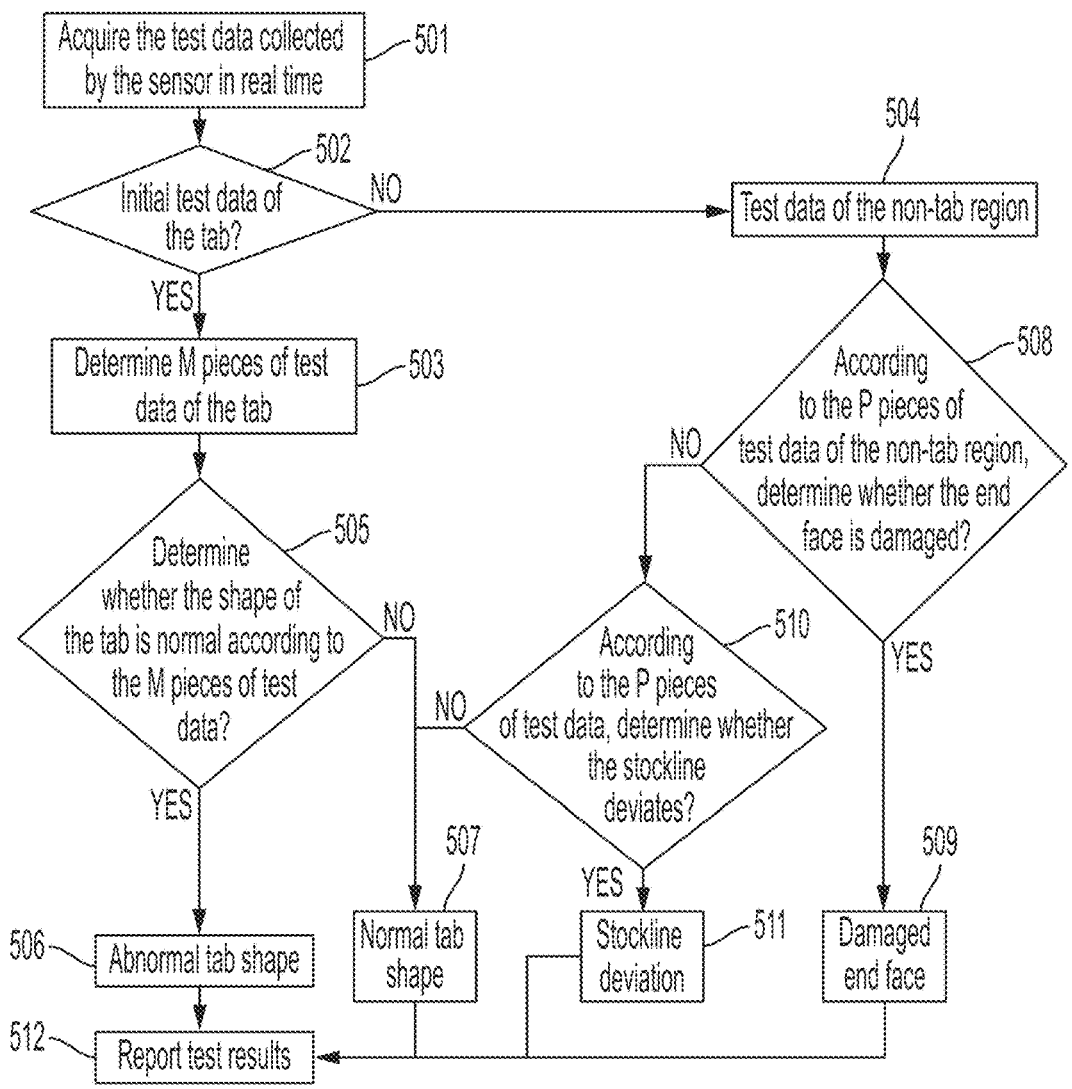
FIG. 8 is a schematic flow chart based on a specific implementation of the methods shown in FIG. 2 and FIG. 7.

It should also be understood that the method 100 and the method 700 can be performed separately, that is, only the tab 222 or the end face 223 is tested; or, the method 100 and the method 700 can also be performed simultaneously, that is, the tab 222 and the end face 223 are tested simultaneously, for example, as shown in FIG. 8.

FIG. 8 is a flow chart of a possible specific implementation of the method 100. As in FIG. 8, the shape of the tab 222 and the end face 223 can be tested, including whether the tab 222 is damaged, whether the tab 222 is folded, whether the end face 223 is damaged, and whether the movement direction of the electrode sheet 221 deviates from the second direction Y.

As shown in FIG. 8, in step 501, the test data collected by the sensor 300 in real time is acquired.

For example, as shown in FIG. 4, the electrode sheet 221 moves along the second direction Y at a certain speed v, and the sensor 300 collects the test data of the electrode sheet 221 at multiple consecutive positions in the second direction Y according to a certain response frequency.

In step 502, based on a suitable trigger condition, it is determined whether the initial test data of the tab 222 is collected.

The trigger condition may be the above-mentioned first trigger condition or the second trigger condition.

If the initial test data of the tab 222 is collected, step 503 is performed; otherwise, step 504 is performed.

In step 503, M consecutive pieces of test data starting from the initial test data of the tab 222 are determined as the M pieces of test data of the tab 222.

In step 505, according to the M pieces of test data, it is determined whether the shape of the tab 222 is normal.

For example, in step 505, it can be judged whether there are more than 2 pieces of test data whose value is smaller than H0/3 in the M/3 pieces of test data in the middle of the M pieces of test data, and whether there are M/2 pieces of test data whose value is greater than 2H0/3 in the 2M/3 pieces of test data at the two ends of the M pieces of test data.

If there are more than 2 pieces of test data whose value is smaller than H0/3 in the M/3 pieces of test data in the middle of the M pieces of test data, and there are M/2 pieces of test data whose value is greater than 2H0/3 in the 2M/3 pieces of test data at the two ends, then it is considered that the tab 222 is damaged, and step 506 is performed; otherwise, step 507 is performed.

For another example, in step 505, it may be determined whether (⅔)×M pieces of test data in the M pieces of test data are smaller than H0−X.

If (⅔)×M pieces of test data in the M pieces of test data are smaller than H0−X, it is considered that the tab 222 is folded, and step 506 is performed; otherwise, step 507 is performed.

In step 506, it is determined that the shape of the tab 222 is abnormal.

In step 507, it is determined that the shape of the tab 222 is normal.

If the initial test data of the tab 222 is not collected in step 502, step 504 is performed.

In step 504, P pieces of test data of the non-tab region are determined.

In step 508, according to the P pieces of test data, it is determined whether the end face 223 is damaged.

For example, in step 508, it may be determined whether there is a difference of 1 mm-3 mm between two adjacent test data among the P pieces of test data of the non-tab region and this type of test data appears for more than 4 times consecutively.

If the difference between two adjacent test data is 1 mm-3 mm and this type of test data appears for more than 4 times consecutively, step 509 is performed; otherwise, step 510 is performed.

In step 509, it is determined that the end face 223 of the electrode sheet 221 is damaged.

In step 510, according to the P pieces of test data, it is determined whether the stockline deviates.

For example, in step 510, it may be determined whether there are more than (⅔)×P pieces of test data larger than 0.5 mm among the P pieces of test data of the non-tab region.

If more than (⅔)×P pieces of test data in the P pieces of test data of the non-tab region are larger than 0.5 mm, step 511 is performed.

In step 511, it is determined that stockline deviation occurs, that is, the movement direction of the electrode sheet 221 deviates from the second direction Y during the test.

In step 512, the test result is reported to the main control system.

When the heights of multiple tabs on the electrode sheet 221 are the same, it can usually be judged whether the tab 222 is folded based on whether the signal emitted by the sensor is interrupted. For example, if the signal is interrupted, it means that the tab 222 is not folded and the signal is interrupted by the tab 222, and if the signal is not interrupted or partially interrupted, it means that the tab 222 is folded. However, this method cannot test tabs 222 whose heights change gradually.

The method for testing an electrode sheet according to the embodiment of the present application can be applied to cases where the heights of multiple tabs on the end face of the electrode sheet change consecutively, so that tabs with different heights are sequentially tested. The method can determine whether the tab is damaged or folded based on the corresponding strategy, so that appropriate measures can then be taken. In addition, in the process of testing the electrode sheet, the method can also test whether the end face of the electrode sheet is damaged and whether the stockline deviates, which ensures the quality of the electrode assembly in many ways.

Figure 9:
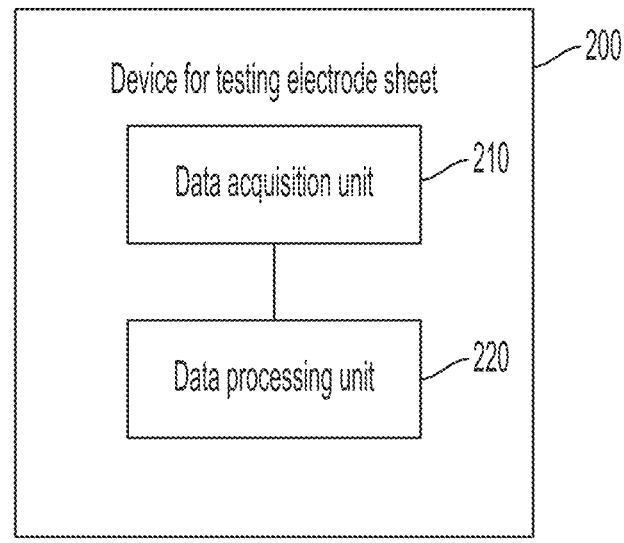
FIG. 9 is a schematic block diagram of a device for testing an electrode sheet according to an embodiment of the present application.

FIG. 9 shows a device 200 for testing an electrode sheet provided in the present application, and the device 200 is used to perform the method 100 in any of the above-mentioned implementations. The device 200 comprises a data acquisition unit 210 and a data processing unit 220.

The data acquisition unit 210 is used to: acquire M pieces of test data of the tab 222, wherein the tab 222 protrudes from the end face of the electrode sheet 221 along the first direction X, the M pieces of test data are the test data of the tab 222 at M consecutive positions along the second direction Y, the M pieces of test data are the test data of the height of the tab 222 in the first direction X, the second direction Y is perpendicular to the first direction X, and M is a positive integer greater than 1.

The data processing unit 220 is used to determine whether the shape of the tab 222 is normal according to the M pieces of test data.

In an implementation, the multiple tabs 222 arranged along the second direction Y on the end face 223 of the electrode sheet 221 have different heights.

In an implementation, the data processing unit 220 is specifically configured to: select N1 pieces of test data from the M pieces of test data, where N1 is a positive integer greater than 1, and N1<M; according to the relationship between the N1 pieces of test data and a first thresholds, determine whether the tab 222 is folded, wherein the first threshold is determined based on the preset height of the tab 222 in the first direction X.

In an implementation, the data processing unit 220 is specifically configured to: determine that the tab 222 is folded if the value of the N1 pieces of test data is smaller than the first threshold.

In an implementation, the first threshold is H0−X or H0/2−X, H0 is the preset height of the tab 222 in the first direction X, and X is a preset value.

For example, N1=(⅔)×M.

In an implementation, the data processing unit 220 is specifically configured to: select N2 pieces of test data and N3 pieces of test data from the M pieces of test data, respectively, N2 and N3 are positive integers greater than 1, N2<M, N3<M; according to the relationship between the N2 pieces of test data and a second threshold, and the relationship between the N3 pieces of test data and a third threshold, determine whether the tab 222 is damaged, wherein the second threshold and the third threshold are determined based on the preset height of the tab 222 in the first direction X.

In an implementation, the data processing unit 220 is specifically configured to: if there are more than K1 consecutive pieces of test data in the N2 pieces of test data whose value is smaller than the second threshold, and there are more than K2 pieces of test data in the N3 pieces of test data whose value is greater than the third threshold, determine that the tab 222 is damaged, wherein K1 and K2 are preset values.

For example, K1=2, and/or, K2=M/2.

In an implementation, the N2 pieces of test data are N2 pieces of test data in the middle of the M pieces of test data, and the N3 pieces of test data are N3 pieces of test data at the two ends of the M pieces of test data.

For example, N2=(1/3)×M, and N3=(2/3)×M.

In an implementation, the second threshold is H0/3, and/or, the third threshold is 2H0/3, wherein H0 is the preset height of the tab 222 in the first direction X.

In an implementation, the data processing unit 220 is further configured to: acquire P pieces of test data of the non-tab region on the end face 223 of the electrode sheet 221, wherein the P pieces of test data are the test data of the non-tab region at P different positions along the second direction Y, the P pieces of test data are the test data corresponding to the height of the non-tab region in the first direction X, and P is a positive integer greater than 1; and according to the P pieces of test data, determine whether the shape of the end face 223 of the electrode sheet 221 is normal.

In an implementation, the data processing unit 220 is specifically configured to: if there are more than Q1 consecutive pieces of test data among the P pieces of test data whose difference with their adjacent test data is in a fourth threshold range, it is determined that the end face 223 of the electrode sheet 221 is damaged, wherein Q1 is a preset value.

For example, the fourth threshold range is between 1 mm and 3 mm.

In an implementation, the data processing unit 220 is specifically configured to: if there are Q2 pieces of test data among the P pieces of test data whose value is greater than a fifth threshold, determine that the movement direction of the electrode sheet 221 deviates from the second direction Y during the test.

For example, the fifth threshold is 0.5 mm.

In an implementation, the device 500 is connected to the sensor 300. The sensor 300 comprises a transmitting end and a receiving end, and the transmitting end 310 and the receiving end 320 are arranged oppositely on the two sides of the electrode sheet 221, so that the electrode sheet 221 moves between the transmitting end 310 and the receiving end 320 along the second direction Y. The transmitting end 310 is used to emit light, and the receiving end 320 is used to collect light signals as the electrode sheet 221 moves to multiple different positions to obtain the corresponding multiple pieces of test data. The data acquisition unit 210 is further configured to: acquire the multiple pieces of test data from the sensor 300; and determine the M pieces of test data of the tab 222 according to the multiple pieces of test data.

In an implementation, the height of the test region formed by the light emitted by the transmitting end 310 in the first direction X covers at least the height of the tab 222.

In an implementation, the sensor 300 is used to test the tab 222 in the process of die-cutting the electrode sheet to form the tab; or, the sensor 300 is used to test the tab 222 in the process of winding the electrode sheet to form an electrode assembly.

In an implementation, the data processing unit 220 is specifically configured to: determine test data whose values change from small to large with the amount of change exceeding a sixth threshold among the multiple pieces of test data as the initial test data in the M pieces of test data; and determine the M consecutive pieces of test data starting from the initial test data as the M pieces of test data of the tab 222.

For example, the sixth threshold is between 3 mm and 5 mm.

In an implementation, the data processing unit 220 is specifically configured to: determine the M pieces of test data from the multiple pieces of test data according to the preset position of the tab 222 on the electrode sheet 221.

For the specific process of testing the tab 222 by the device 200, reference may be made to the description of the method 100 in various embodiments of the present application, and for the sake of brevity, details are not repeated here.

Figure 10:
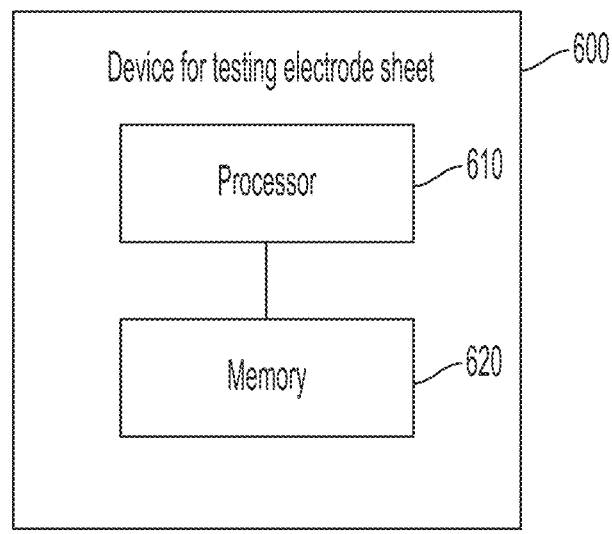
FIG. 10 is a schematic block diagram of a device for testing an electrode sheet according to an embodiment of the present application.

As shown in FIG. 10, the present application further provides a device for testing electrode sheet 600, which comprises a processor 610 and a memory 620, wherein the memory 620 is used to store a computer program, and the processor 610 is used to call the computer program to execute the method 100 of any one of the aforementioned implementations.

For the specific process of testing the tab by the device 600, reference may be made to the description of the method 100 in various embodiments of the present application, and for the sake of brevity, details are not repeated here.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather comprises all technical solutions falling within the scope of the claims.

The invention claimed is:

1. A method for testing an electrode sheet, wherein the method comprises:
   acquiring M pieces of test data of a tab, wherein the tab protrudes from an end face of an electrode sheet along a first direction, the M pieces of test data are the test data of a height of the tab in the first direction at M consecutive positions along a second direction, the second direction is perpendicular to the first direction, and M is a positive integer greater than 1; and
   determining whether a shape of the tab is normal based on a change of the height of the tab at the M consecutive positions according to the M pieces of test data.

2. The method according to claim 1, wherein multiple tabs arranged on the end face of the electrode sheet along the second direction have different heights.

3. The method according to claim 1, wherein the determining whether the shape of the tab is normal according to the M pieces of test data comprises:

selecting N1 pieces of test data from the M pieces of test data, wherein N1 is a positive integer greater than 1, and N1<M; and determining whether the tab is folded according to a relationship between the N1 pieces of test data and a first threshold, wherein the first threshold is determined based on a preset height of the tab in the first direction.

4. The method according to claim 3, wherein the determining whether the tab is folded according to the relationship between the N1 pieces of test data and a first threshold comprises:

if the values of the N1 pieces of test data are smaller than the first threshold, determining that the tab is folded.

5. The method according to claim 3, wherein the first threshold is H0−X or H0/2−X, H0 is the preset height of the tab in the first direction, and X is a preset value.

6. The method according to claim 3, wherein N1=(⅔)×M.

7. The method according to claim 1, wherein the determining whether the shape of the tab is normal according to the M pieces of test data comprises:

from the M pieces of test data, selecting N2 pieces of test data and N3 pieces of test data, respectively, wherein N2 and N3 are positive integers greater than 1, N2<M, and N3<M; and determining whether the tab is damaged according to a relationship between the N2 pieces of test data and a second threshold and a relationship between the N3 pieces of test data and a third threshold, wherein the second threshold and the third threshold are determined based on the preset height of the tab in the first direction.

8. The method according to claim 7, wherein the determining whether the tab is damaged according to the relationship between the N2 pieces of test data and a second threshold and the relationship between the N3 pieces of test data and a third threshold comprises:

if there are more than K1 consecutive pieces of test data in the N2 pieces of test data whose value is smaller than the second threshold, and there are more than K2 pieces of test data in the N3 pieces of test data whose value is greater than the third threshold, determining that the tab is damaged, wherein K1 and K2 are preset values.

9. The method according to claim 8, wherein K1=2, and/or K2=M/2.

10. The method according to claim 7, wherein the N2 pieces of test data are N2 pieces of test data in a middle of the M pieces of test data, and the N3 pieces of test data are N3 pieces of test data at two ends of the M pieces of test data.

11. The method according to claim 7, wherein N2=(⅓)×M, and N3=(⅔)×M.

12. The method according to claim 7, wherein the second threshold is H0/3, and/or the third threshold is 2H0/3, and H0 is the preset height of the tab in the first direction.

13. The method according to claim 1, wherein the method further comprises:

acquiring P pieces of test data of a non-tab region on the end face of the electrode sheet, wherein the P pieces of test data are the test data of the non-tab region at P different positions along the second direction, the P pieces of test data are the test data corresponding to heights of the non-tab region in the first direction, and P is a positive integer greater than 1; and determining whether the shape of the end face of the electrode sheet is normal according to the P pieces of test data.

14. The method according to claim 13, wherein the determining whether the shape of the end face of the electrode sheet is normal according to the P pieces of test data comprises:

if there are more than Q1 consecutive pieces of test data in the P pieces of test data whose difference with their adjacent test data is in a fourth threshold range, determining that the end face of the electrode sheet is damaged, wherein Q1 is a preset value.

15. The method according to claim 13, wherein the fourth threshold ranges between 1 mm and 3 mm.

16. The method according to claim 13, wherein the determining whether the shape of the end face of the electrode sheet is normal according to the P pieces of test data comprises:

if there are Q2 pieces of test data in the P pieces of test data whose value is greater than a fifth threshold, determining that a movement direction of the electrode sheet deviates from the second direction during the test.

17. The method according to claim 15, wherein the fifth threshold is 0.5 mm.

18. The method according to claim 1, wherein the method is performed by a device for testing electrode sheet, the device is connected to a sensor, the sensor comprises a transmitting end and a receiving end, the transmitting end and the receiving end are arranged oppositely on the two sides of the electrode sheet, so that the electrode sheet moves between the transmitting end and the receiving end along the second direction; the transmitting end is used for emitting light, and the receiving end is used for collecting optical signals as the electrode sheet moves to multiple different positions so as to acquire corresponding multiple pieces of test data, the acquiring M pieces of test data of the tab comprises:

acquiring the multiple pieces of test data from the sensor; and determining the M pieces of test data of the tab according to the multiple pieces of test data.

19. The method according to claim 18, wherein a height of the test region formed by the light emitted by the transmitting end in the first direction at least covers the height of the tab.

20. The method according to claim 18, wherein the sensor is used to test the tab in a process of die-cutting the electrode sheet to form the tab; or, the sensor is used to test the tab in the process of winding the electrode sheet to form an electrode assembly.

21. The method according to claim 18, wherein the determining the M pieces of test data of the tab according to the multiple pieces of test data comprises:

determining the test data in the multiple pieces of test data whose numerical value changes from small to large with an amount of change exceeding a sixth threshold as an initial test data in the M pieces of test data; and determining the M consecutive pieces of test data starting from the initial test data as the M pieces of test data of the tab.

22. The method according to claim 21, wherein the sixth threshold is between 3 mm and 5 mm.

23. The method according to claim 18, wherein the determining the M pieces of test data of the tab according to the multiple pieces of test data comprises:

determining the M pieces of test data from the multiple pieces of test data according to a preset position of the tab on the electrode sheet.

24. A device for testing electrode sheet, comprising a processor and a memory, wherein the memory is used to store a computer program, and the processor is used to call the computer program to execute the method for testing an electrode sheet of claim 1.

25. A method for testing an electrode sheet, wherein a tab is provided on an end face of the electrode sheet along a first direction, and the method comprises:

acquiring P pieces of test data of a non-tab region on the end face, wherein the P pieces of test data are the test data corresponding to a height of the non-tab region in the first direction at P different positions along a second direction, and P is a positive integer greater than 1; and determining whether a shape of the end face of the electrode sheet is normal based on a change of the height of the tab at the M consecutive positions according to the P pieces of test data.

26. The method according to claim 25, wherein the determining whether the shape of the end face of the electrode sheet is normal according to the pieces of test data comprises:

if there are more than Q1 consecutive pieces of test data in the P pieces of test data whose difference with their adjacent test data is in a fourth threshold range, determining that the end face of the electrode sheet is damaged, wherein Q1 is a preset value.

27. The method according to claim 25, wherein the fourth threshold ranges between 1 mm and 3 mm.

28. The method according to claim 25, wherein the determining whether the shape of the end face of the electrode sheet is normal according to the P pieces of test data comprises:

if there are Q2 pieces of test data in the P pieces of test data whose value is greater than a fifth threshold, determining that a movement direction of the electrode sheet deviates from the second direction during the test.

29. The method according to claim 27, wherein the fifth threshold is 0.5 mm.

30. A device for testing electrode sheet, comprising a processor and a memory, wherein the memory is used to store a computer program, and the processor is used to call the computer program to execute the method for testing an electrode sheet of claim 25.

* * * * *